United States Patent
Yamazaki

[19]

[11] Patent Number: 5,933,461
[45] Date of Patent: Aug. 3, 1999

[54] DATA RECEIVING APPARATUS, DEMODULATOR CIRCUIT AND INTEGRATED CIRCUIT

[75] Inventor: Daisuke Yamazaki, Kanagawa, Japan

[73] Assignee: Sony Corporation, Tokyo, Japan

[21] Appl. No.: 08/711,280

[22] Filed: Sep. 12, 1996

[30] Foreign Application Priority Data

Sep. 25, 1995 [JP] Japan ................................. P07-270542

[51] Int. Cl.⁶ .................................................. H03D 1/00
[52] U.S. Cl. .......................... 375/340; 375/286; 375/287
[58] Field of Search .................................. 375/286, 287, 375/272, 316, 334, 340; 329/300

[56] References Cited

U.S. PATENT DOCUMENTS

| | | | |
|---|---|---|---|
| 4,239,934 | 12/1980 | Andren et al. ........................... | 375/113 |
| 4,281,412 | 7/1981 | Wissel et al. ............................. | 375/86 |
| 4,841,301 | 6/1989 | Ichihara . | |
| 5,367,535 | 11/1994 | Scholz . | |
| 5,425,053 | 6/1995 | Matsumoto . | |
| 5,452,326 | 2/1993 | Tanaka .................................... | 375/376 |
| 5,602,877 | 2/1997 | Boccuzi et al. .......................... | 375/336 |
| 5,659,582 | 8/1997 | Kojima et al. ........................... | 375/345 |
| 5,684,874 | 11/1997 | Yagyu et al. ............................. | 379/382 |
| 5,781,588 | 11/1995 | Abe et al. ................................ | 375/334 |

FOREIGN PATENT DOCUMENTS

0659000 A2   6/1995   European Pat. Off. .

Primary Examiner—Tesfaldet Bocure
Assistant Examiner—Bayard Emmanuel
Attorney, Agent, or Firm—Ronald P. Kananen; Rader, Fishman & Grauer

[57] ABSTRACT

A data receiving apparatus, a demodulator circuit and an integrated circuit that are simplified in the general constitution and enable the consumed power to be reduced. After decomposed into both the comparison result (S7) between an optional threshold controlled corresponding to the DC offset of the demodulated signal (S3) and the absolute value of the amplitude of the demodulated signal (S3) and the detected result (S8) of detecting the polarity of the demodulated signal (S3), transmitted data (S5) represented by the amplitude of a demodulated signal (S3) containing the amplitude component corresponding to the transmitted data (S5) are outputted and the transmitted data (S5) are regenerated by using these comparison result (S7) and detection result (S8).

10 Claims, 3 Drawing Sheets

DATA RECEIVING APPARATUS, DEMODULATOR CIRCUIT AND INTEGRATED CIRCUIT

BACKGROUND OF THE INVENTION

1. Filed of the Invention

The present invention relates to a data receiving apparatus, a demodulator and an integrated circuit, and is applicable, for example, to a portable message receiver for receiving data sent by radio and displaying a message.

2. Description of the Rrelated Art

So far, this type of portable message receiver, so-called pager, has received message data transmitted by two-valued FSK (Frequency Shift Keying), generated a ring back tone and displayed a message. On the other hand, together with a speed-up in the modulating speed of message data, by adopting a multi-valued, four- or more-valued, FSK instead of two-valued FSK, a large capacity of message data can be transmitted.

The scheme for receiving message data transmitted by this four-valued FSK is still at the stage of introduction. For this reason, among portable message receivers for receiving message data sent by 4-valued FSK, there was a receiver used in combination of a conventionally employed intermediate frequency integrated circuit and detector integrated circuit with an analog-digital convertor.

That is, as shown in FIG. 1, a portable message receiver 1 gives a high-frequency input signal S1 obtained from the antenna 2 to the high-frequency section 3 and gives the high-frequency signal S2 tuned, amplified and automatically gain-controlled to the intermediate frequency section 4. The intermediate frequency section 4 converts a high-frequency signal S2 into an intermediate frequency signal by using the local oscillation signal and gives the 4-valued analog signal S3 obtained by detection to the analog-to-digital convertor (in FIG. 1, designated with A/D) 5.

The analog-to-digital convertor 5 converts the 4-valued analog signal S3 into 8-bit digital data S4 and gives them to the decoder 6. The decoder 6 makes up the digital data S4 into a binary data string, gives the message data S5 obtained from this binary data string to the display section 7 and has a message displayed in alphabetic or numeric characters.

Incidentally, the frequency shift keying is one type of frequency modulation scheme, in which individual frequencies are allotted to marks and spaces of the digital signal to be sent and sends out digital signal while switching the frequency.

Before converting a 4-valued analog signal S3 into 8-bit digital signal S4, the analog-to-digital convertor 5 judges the level and converts the analog signal S3 into a 2-bit digital signal. At this time, the analog-to-digital convertor 5 judges the level of four types of analog signals S3 as 00, 01, 11 and 10 in sequence from the lowest side by using three threshold values mutually different in potential.

Meanwhile, in an analog signal S3, a DC offset, such as frequency drift of the oscillator in the intermediate frequency section 4, due to a temperature fluctuation of the receiving system arises. From the need for canceling the influence of this offset, a correction circuit for processing the digital data S4 with a complicated correction algorithm is constructed in the decoder 6.

However, by processing a 4-valued analog signal S3 in the analog-to-digital convertor 5, a greater amount of consumed power is required by the portion consumed for the analog-to-digital convertor 5. Accordingly, there was a problem that this excess power consumption forms a great factor in preventing the most important long-life operation for a portable message receiver.

In addition, adopting the arrangement that the DC offset is canceled after the analog-to-digital conversion leads to an enlargement of circuit scale, so that the consumed power is increased correspondingly. Furthermore, because the reference level employed in judging the level cannot be made variable, there was disadvantage of being weak for or not flexibly coping with troubles very highly possible, such as level lowering due to a rapid and abrupt change in electric field intensity or fluctuation of DC component due to a fading.

SUMMARY OF THE INVENTION

In view of the foregoing, an object of the present invention is to provide a data receiving apparatus, demodulator circuit and integrated circuit that are simplified in the general constitution and enable the consumed power to be reduced.

The foregoing object and other objects of the invention have been achieved by the provision of a data receiving apparatus, demodulator circuit and integrated circuit in which the demodulating means demodulates a converted signal with the modulated signal that was modulated in accordance with transmitted data being given and generates a modulated signal containing the amplitude component corresponding to the transmitted data. The polarity detection means detects the polarity of the amplitude of the demodulated signal. The absolute value comparison means compares the absolute value of the demodulated signal with any threshold value. In addition, the transmitted data is generated on the basis of the detection result of the polarity detection means and the comparison result of the absolute value comparison means.

Since after decomposed into both the comparison result between an optional threshold controlled corresponding to the DC offset of the demodulated signal and the absolute value of the amplitude of the demodulated signal and the detected result of detecting the polarity of the demodulated signal, transmitted data represented by the amplitude of a demodulated signal containing the amplitude component corresponding to the transmitted data are outputted to the decoder and transmitted data are regenerated by using these comparison and detection results, the general arrangement is simplified and the consumed power can be reduced further.

In addition, according to the present invention, on the demodulator circuit for demodulating a modulated signal to generate a demodulated signal containing an amplitude component corresponding to the transmitted data with the demodulated signal demodulated in accordance with the transmitted data being given, polarity detection means for detecting the polarity of a demodulated signal and absolute value comparison means for comparing the absolute value of the amplitude of the demodulated signal with an optional threshold are provided.

Furthermore, according to the present invention, on a substrate with the modulated signal modulated in accordance with transmitted data being given, mutilator means for demodulating the modulated signal to generate a demodulated signal containing an amplitude component corresponding to the transmitted data, polarity detection means for detecting the polarity of the amplitude of the demodulated signal and absolute value comparison means for comparing the absolute value of the demodulated signal with an optional threshold.

The nature, principle and utility of the invention will become more apparent from the following detailed description when read in conjunction with the accompanying in which like parts are designated by like reference numerals or characters.

DETAILED DESCRIPTION OF THE EMBODIMENT

Figure 1:
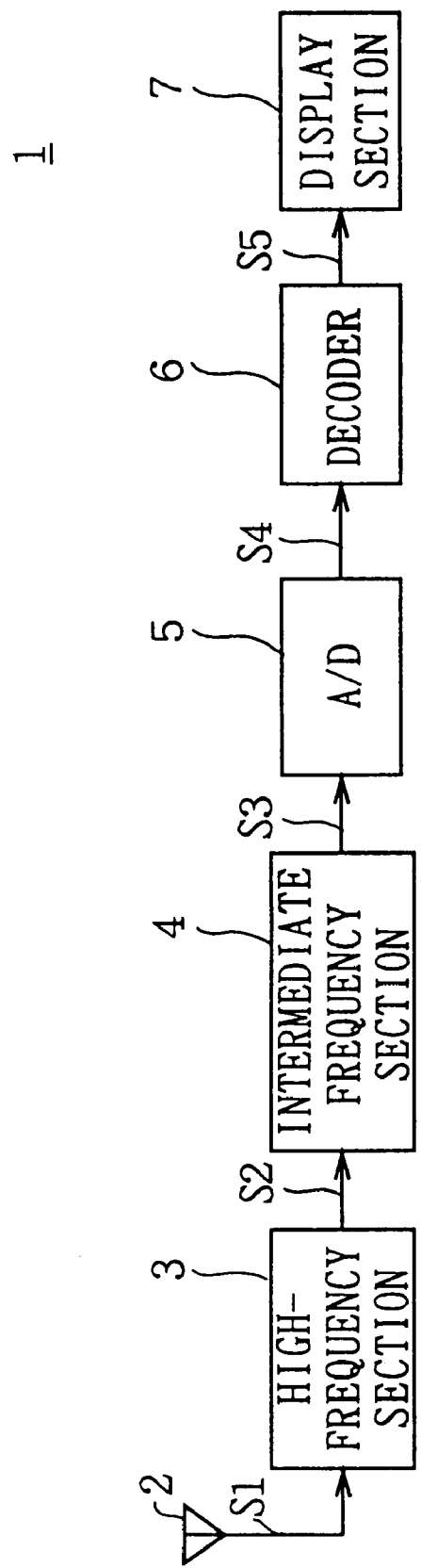
FIG. 1 is a block diagram showing the arrangement of a conventional portable message receiver.
Figure 2:
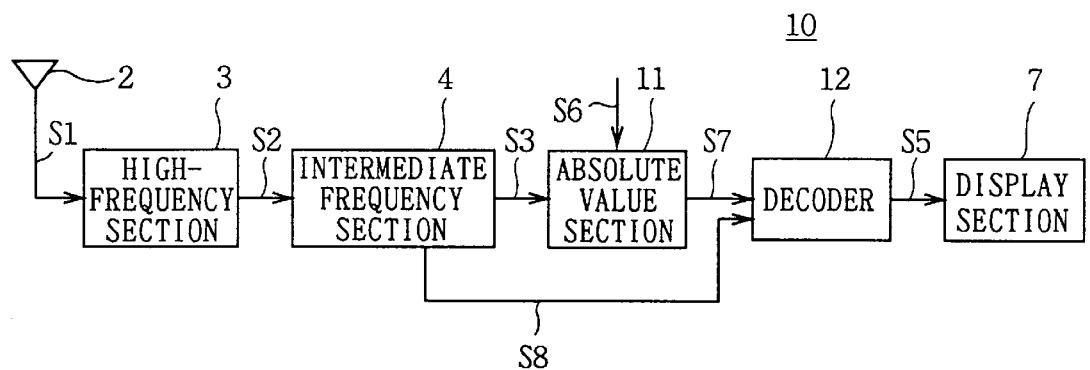
FIG. 2 is a block diagram showing the arrangement of a portable message receiver based on one embodiment of data receiving apparatus, demodulator circuit and integrated circuit according to the present invention.

Preferred embodiment of the present invention will be described with reference to the accompanying drawings:

FIG. 2 with the same symbols assigned to those corresponding to parts in FIG. 1, shows a data receiving apparatus, e.g., portable message receiver 10, receives a radio wave modulated by 4-valued FSK in accordance with transmitted data, e.g., message data, and displays a message on the screen of the display section 7. Instead of the analog-to-digital convertor 5 and the decoder 6 out of the constituents of a conventional portable message receiver 1, a portable message receiver 10 has absolute value comparison means, e.g., an absolute value comparison section 11 and a decoder 12 arranged.

A portable message receiver 10 gives the high-frequency input signal S1 obtained from the antenna 2 to the high-frequency section 3 and gives a high-frequency signal S2 to the intermediate frequency section 4. The intermediate frequency section 4 gives a demodulated signal, e.g., analog signal S3, containing amplitude components, e.g., 4-valued amplitudes comprising two greater and smaller values of positive polarity and two greater and smaller values of negative polarity, corresponding to message data to the absolute value comparison section 11.

Comparing the threshold adjusted by a control signal S6 with the amplitude of an analog signal S3, the absolute value comparison section 11 generates the size compared result of the detected amplitude of the analog signal S3 independently of the polarity, e.g., an absolute value comparison signal S7. The absolute value comparison section 11 gives this absolute value comparison signal S7 to the decoder 12.

In addition, the intermediate frequency section 4 gives the result, e.g., NRZ (Non Return to Zero) signal S8, obtained by detecting the polarity of an analog signal S3 to the decoder 12.

As a result, to the decoder 12 are given the superior and inferior bits of an analog signal S3 expressed in 2 bits respectively in accordance with the NRZ signal S8 and the absolute value comparison signal S7.

The decoder 12 processes the NRZ signal S8 and the absolute value comparison signal S7, generates message data S5, gives the message data S5 to the display section 7 and makes the content based on the message data S5, e.g., message in alphabetic or numeric characters displayed.

Incidentally, the amplitudes of 4-valued analog signals S3 include the larger amplitude of negative polarity, the smaller amplitude of negative polarity, the smaller amplitude of positive polarity and the larger amplitude of positive polarity corresponding to values of 2-bit binary data, 00, 01, 11 and 10, respectively. In addition, the larger amplitude of negative polarity, the smaller amplitude of negative polarity, the smaller amplitude of positive polarity and the larger amplitude of positive polarity correspond, for example, to the shifts from the center frequency being −4.8[kHz], −1.6[kHz], +1.6[kHz] and +4.8[kHz], respectively.

Figure 3:
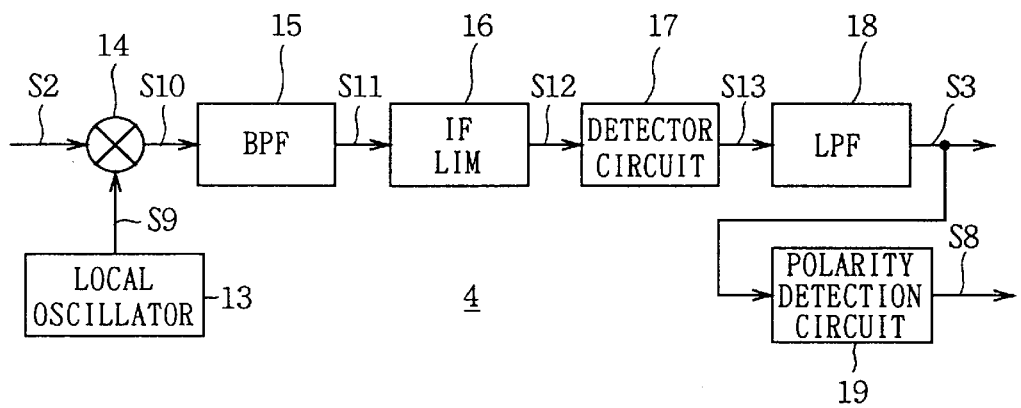
FIG. 3 is a block diagram showing the arrangement of an intermediate frequency section.

As shown in FIG. 3, the intermediate frequency section 4, comprising an integrated circuit arrangement, mixes a high-frequency signal S2 with a local oscillation signal S9 generated by the local oscillator 13 in the mixer 14 and frequency-converts the frequency signal S2 into an intermediate frequency signal S10. The mixer 14 gives this intermediate frequency signal S10 via the band-pass filter 15 (in FIG. 3, designated with BPF) to the limiter 16 as intermediate frequency signal S11 and gives an amplitude-limited modulated signal, e.g., intermediate frequency signal S12, to demodulating means, e.g., detector circuit 17.

The detector circuit 17 decodes detects the intermediate frequency signal S12 to be demodulated to a bipolar base-band signal S13 and outputs this base-band signal S13 via the low-pass filter 18 as a 4-valued analog signal S3. The low-pass filter 18 gives the analog signal S3 to polarity detecting means, e.g., polarity detector circuit 19 and makes a NRZ signal S8 outputted.

Figure 4:
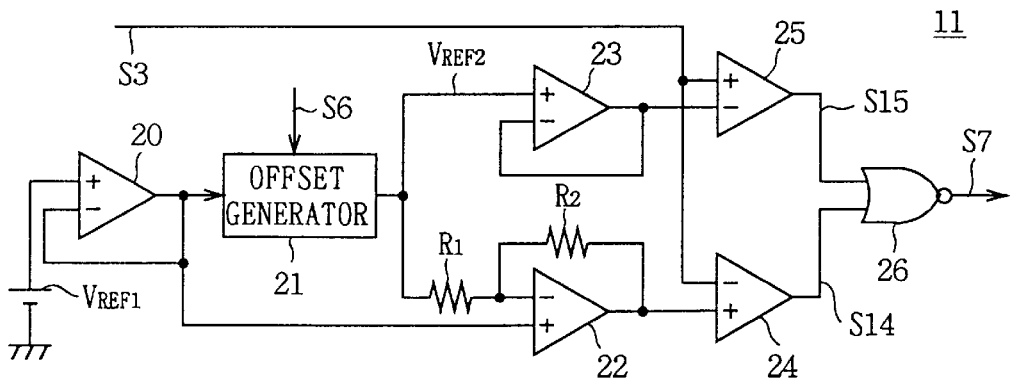
FIG. 4 is a block diagram showing the arrangement of an absolute value comparison section.

The absolute value comparison section 11 comprises an integrated circuit arrangement. As shown in FIG. 4, the absolute value comparison section 11 gives a reference voltage $V_{REF1}$ to the offset generator circuit 21 via the buffer operational amplifier 20 and to the non-inversional input end of the buffer operational amplifier 22 as well. The offset generator circuit 21 adds a positive DC voltage $V_{CONT}$ to the reference voltage $V_{REF}$ to generate a reference voltage $V_{REF2}$ and gives this reference voltage $V_{REF2}$ to the non-inversional input end of the operational amplifier 23 and to the inversional end of the operational amplifier 22.

In this way, the operational amplifier 22 gives the reference voltage $V_{REF1}-V_{CONT}$ to the non-inversional end of the operational amplifier 24 as a threshold, whereas the operational amplifier 23 gives the reference voltage $V_{REF1}+V_{CONT}$ to the inversional end of the operational amplifier 25 as a threshold.

The operational amplifier 24 compares the amplitude of the analog signal S3 given to the inversional end with the reference voltage $V_{REF1}-V_{CONT}$. In this way, a comparison signal S14 which becomes the logic "1" level only when the amplitude of the analog signal S3 is a negative greater amplitude is finally given by the operational amplifier 24 as a first conditional input of the 2-input NOR circuit 26.

On the other hand, the operational amplifier 25 compares the amplitude of the analog signal S3 given to the non-inversional end with the reference voltage $V_{REF1}+V_{CONT}$. In this way, a comparison signal S15 which becomes the logic "1" level only when the amplitude of the analog signal S3 is a positive greater amplitude is finally given by the operational amplifier 25 as a second conditional input of the 2-input NOR circuit 26.

Thus, the 2-input NOR circuit 26 outputs an absolute value signal S7 which becomes the logic "0" level for a positive or negative greater amplitude and becomes the logic "1" level for a positive or negative smaller amplitude.

In the absolute value comparison section 11 according to the above arrangement, the reference voltage $V_{REF1}$ coincident with the DC offset of the analog signal S3 is given to the offset generator circuit 21. And in the absolute value comparison section 11, the positive and negative thresholds are set at an optional level between the greater amplitude (superior level) and the smaller amplitude (inferior level).

Figure 5A:
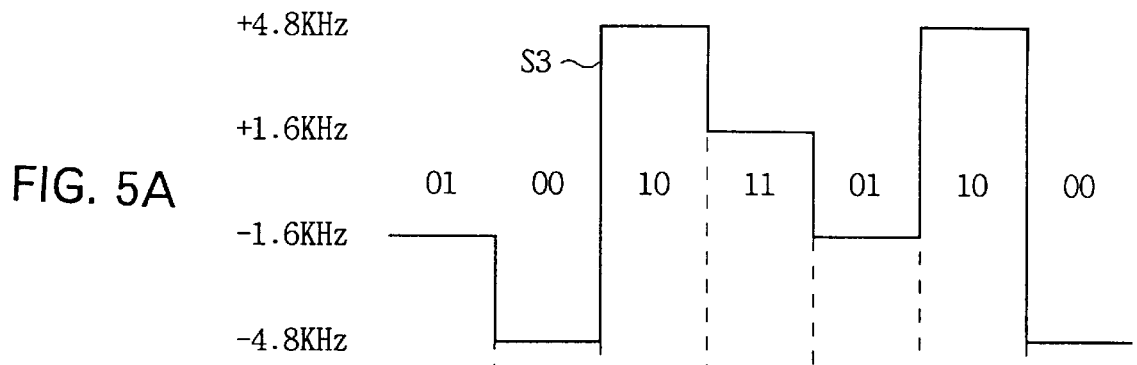
FIGS. 5A–5C is a timing chart showing the timing of each signal.
Figure 5B:
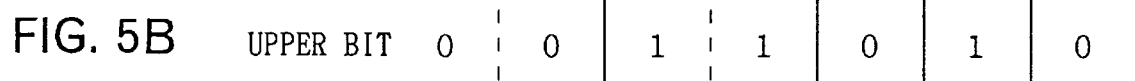
Figure 5C:
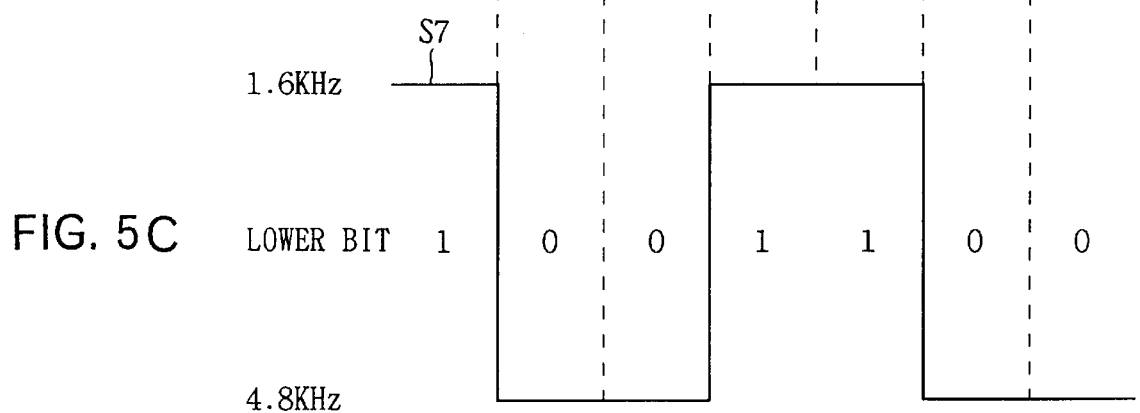

A case of 2-bit binary data will be considered which take their changing values of 01, 00, 10, 11, 01, 10 and 00 in sequence as shown in FIG. 5. In this case, the NRZ signal S8 becomes "L", "L", "H", "H", "L", "H" and "L" levels in sequence. This means that the NRZ signal S8 becomes always the "L" level if the superior bit of binary data indicated by the analog signal S3 is "0" and the NRZ signal S8 becomes always the "H" level if the superior bit of binary data indicated by the analog signal S3 is "1".

On the other hand, the absolute value comparison signal S7 becomes "H", "L", "L", "H", "H", "L" and "L" levels in sequence. This means that the absolute value comparison signal S7 becomes always the "L" level if the inferior bit of binary data indicated by the analog signal S3 is "0" and the absolute value comparison signal S7 becomes always the "H" level if the inferior bit of binary data indicated by the analog signal S3 is "1".

Here, when a DC offset different from the initial level takes place in the analog signal S3 due to temperature fluctuations of the receiving system and the like, the reference voltage $V_{REF1}$ given to the offset generator circuit 21 is so adjusted as to be equal to this DC offset level, e.g., by feed-back control. In this way, the thresholds of the operational amplifiers 22 and 23 are so adjusted as to hover corresponding to the DC offset level after adjustment, the influence of the DC offset is removed and consequently a stable and highly reliable absolute value comparison signal S7 is outputted.

On the other hand, the polarity detection circuit 19 outputs the NRZ signal S8 free from the influence of the DC offset because the polarity of the analog signal S3 is invariant independently of the degree of the DC offset. In this way, to the decoder 12 are given the NRZ signal S8 and a highly reliable absolute value comparison signal S7 in which the DC offset in the analog signal S3 is already canceled, so that the circuit arrangement for generating message data S5 becomes further simpler than the conventional and moreover correct message data S5 can be generated always without affected by the DC offset.

Thus, use of a conventional analog-to-digital converter 5 and a complicated correction circuit serving to cancel the influence of the DC offset in a digital signal S4 outputted by this analog-to-digital convertor 5 becomes unnecessary, so that the general arrangement is simplified by this and the consumed power can be further reduced. In addition, by a simple decoding processing using the NRZ signal S8 and the absolute value comparison signal S7, message data S5 can be generated.

According to the above arrangement, after decomposed into both the comparison result between the threshold controlled upward or downward corresponding to the DC offset of the analog signal S3 and the absolute value of the amplitude of the analog signal S3 and the NRZ signal S8 obtained by detecting the polarity of the analog signal S3, 4-valued data represented by the amplitude of a analog signal S3 are outputted and message data are regenerated by using these absolute value comparison signal S7 and NRZ signal S8, so that the general arrangement is simplified and the consumed power can be further reduced.

By optionally setting the threshold of the absolute value comparison section 11 in conformity to a change in the environment under which the receiver is laid, such as a fluctuation in output level due to a radical decrease in field strength and the like, the resistivity to a change in the environment can be strengthened. Furthermore, by giving hysteresis to the operation of the polarity detection circuit 19 and the absolute value comparison section 11 and making this hysteresis optionally variable, the sensitivity to noise can be lowered equivalently.

Meanwhile, in the above embodiment, the case of receiving 4-valued data is described, but the present invention is not limited to this and is applicable also to an optional case of receiving multi-valued data. For example, in the case of receiving 6-valued data, a plurality of values can be individually identified by the parallel provision of absolute value comparison means similar in arrangement to the absolute value comparison section 11 but different only in threshold and can attain an effectiveness similar to the above-mentioned. For 2-valued FSK demodulation, set data are regenerated by the NRZ signal S8 alone as conventional.

In addition, in the above embodiment, the case of demodulating a modulated signal modulated by FSK is described, but the present invention is not limited to this and is applicable also to a case of demodulating a modulated signal modulated by an optional modulation scheme provided the amplitude component corresponding to transmitted data is contained in the amplitude of the demodulation signal obtained by demodulating a modulated signal.

Furthermore, in the above embodiment, the case of individually arranging the intermediate frequency section 4 and the absolute value comparison section 11 into separate integrated circuits is described, but the present invention is not limited to this and is applicable also to a case of arranging the intermediate frequency section 4 and the absolute value comparison section 11 into one and the same integrated circuit.

Still further in the above embodiment, the case of transmitted data being transmitted by electric wave is described, but the present invention is not limited to this and is applicable also to a case of employing optional information carrier means, such as light, other than electric wave and transmitting on an optional transmission path, such as an electric wire or optical fiber.

Like these, according to the present invention, after decomposed into both the comparison result between an optional threshold controlled corresponding to the DC offset of the demodulated signal and the absolute value of the amplitude of the demodulated signal and the detected result of detecting the polarity of the demodulated signal, transmitted data represented by the amplitude of a demodulated signal containing the amplitude component corresponding to the transmitted data are outputted and the transmitted data are regenerated by using these comparison and detection results, so that the general arrangement is simplified and the consumed power can be reduced further.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A data receiving apparatus comprising:
   demodulation means for receiving a modulated signal modulated in accordance with transmitted data and demodulating said modulated signal to generate a demodulated signal including the amplitude component corresponding to said transmitted data;

polarity detection means for detecting the polarity of the amplitude of said demodulated signal;

absolute value comparison means for comparing the absolute value of said demodulated signal with an optional threshold; and data generation means for generation said transmitted data on the basis of the results received from said polarity detection means and said absolute value comparison means.

2. The data receiving apparatus according to claim 1, wherein said modulated signal is modulated by FSK (Frequency Shift Keying).

3. The data receiving apparatus according to claim 1, wherein:

said transmitted data are given in a plurality of values; and said modulated signal has a plurality of amplitude components.

4. The data receiving apparatus according to claim 3 wherein said plurality of values are given in four values.

5. The data receiving apparatus according to claim 1 wherein said demodulated signal contains a positive amplitude component and a negative amplitude component.

6. The data receiving apparatus according to claim 3 wherein said demodulated signal contains a positive amplitude component and a negative amplitude component.

7. The data receiving apparatus according to claim 4 wherein said demodulated signal contains a positive amplitude component and a negative amplitude component.

8. The data receiving apparatus according to claim 1 wherein the content based on the regeneration of said transmitted data is displayed on a display screen.

9. A demodulator circuit for receiving a modulated signal modulated in accordance with transmitted data and for demodulating said modulated signal to generate a demodulated signal containing an amplitude component corresponding to said transmitted data, comprising:

polarity detection means for detecting the polarity of the amplitude of said demodulated signal;

absolute value comparison means for comparing the absolute value of said demodulated signal with an optional threshold; and decoder means for generating said transmitted data on the basis of the results received from said polarity detection means and said absolute value comparison means.

10. The data receiving apparatus according to claim 1, wherein said data generation means is a decoder.

\* \* \* \* \*

UNITED STATES PATENT AND TRADEMARK OFFICE
CERTIFICATE OF CORRECTION

PATENT NO. : 5,933,461
DATED : August 3, 1999
INVENTOR(S) : Daisuke Yamazaki

It is certified that error appears in the above-identified patent and that said Letters Patent is hereby corrected as shown below:

Column 7, Line 9, "generation" should read -- generating --. (2nd occur.)

Signed and Sealed this

Twelfth Day of September, 2000

Attest:

Q. TODD DICKINSON

Attesting Officer

Director of Patents and Trademarks